United States Patent Office 3,272,698
Patented Sept. 13, 1966

3,272,698
SPARSOMYCIN A INSECTICIDE
Alan J. Lemin, Richland Township, Kalamazoo County, and Paul W. O'Connell, Kalamazoo, Mich., assignors to The Upjohn Company, Kalamazoo, Mich., a corporation of Delaware
No Drawing. Filed Apr. 30, 1964, Ser. No. 363,998
11 Claims. (Cl. 167—30)

This invention pertains to a novel biological process and novel compositions. The invention is more particularly directed to the novel process for controlling insect pests with sparsomycin A, and novel compositions comprising an insect nutriment or food with sparsomycin A.

Sparsomycin A is a biosynthetic compound produced by a species of actinomycete, *Streptomyces sparsogenes* var. *sparsogenes*, NRRL 2940, under controlled culture conditions in a nutrient medium. Production, recovery, and purification of sparsomycin A are described in Preparation I, hereinbelow. The compound is known to be useful as an antibiotic.

It has now been found, in accordance with the invention, that sparsomycin A is an insect poison. It has been found that sparsomycin A is a poison for insects, and causes reproductive sterility.

This newly discovered activity of sparsomycin A provides a novel means for controlling insect pests by preventing reproduction. When insects are rendered reproductively sterile with sparsomycin A the females either fail to lay eggs or the eggs that are laid do not hatch. In the course of time, the adult insects age and die, the number of reproducing individuals becomes too small to maintain pestiferous populations, and control is thus achieved.

The insect sterilant properties of sparsomycin A depend upon the susceptibility of the various insects as well as the amount of active ingredient used. In general, small amounts of sparsomycin A effect sterilization; and, hence, in accordance with practical economic considerations, it is preferably used in the amounts just sufficient for effective sterilization. In accordance with the invention, a pestiferous population of insects is not wiped out immediately; but succeeding generations are significantly reduced in numbers and reproductive potential, and undesirable pests can even be completely eradicated.

Sparsomycin A is active in low concentrations against flies, mosquitoes, thrips, bean beetles, mites, aphids, army worms, salt marsh caterpillars and other lepidopterous larvae. As used herein, the term "insect" is used in the same sense as in the Federal Insecticide, Fungicide, and Rodenticide Act of 1947 and refers generally to animals comprising the Phylum Arthropoda, illustratively, class Insecta, for example, orders Isoptera, Thysanoptera, Mallophaga, Hemiptera, Anoplura, Homoptera, Coleoptera, Lepidoptera, Orthoptera, Diptera, and Hymenoptera; and class Arachnida, for example, orders Araneae and Acarina.

In accordance with the process of the invention, insects are poisoned with sparsomycin A by means of direct topical applications, ingestion, or residual contact. The compound can be used as a sterilant in its pure form, but for practical purposes it is preferred that the process be effected with dilute formulations of sparsomycin A according to the invention, some of which are novel.

Insects susceptible to poisoning with sparsomycin A are readily controlled by spraying or dusting them directly or by spraying or dusting plants, objects, or other environs where they feed, hide, congregate, or mate. For this purpose aqueous and organic solutions, dusts, wettable powders, emulsifiable concentrates, and other readily dispersible formulations are contemplated as useful embodiments for effecting the process of the invention. Aqueous and organic solutions of sparsomycin A can be readily prepared by dissolving the compound in water or in a polar organic solvent such as methanol, ethanol, acetone, ethylene dichloride, and the like.

It is usually desirable, particularly in the case of aqueous spray formulations, to include adjuvants such as wetting agents, spreading agents, dispersing agents, stickers or adhesives, and the like, in accordance with usual agricultural practices. Any of the conventional wetting and dispersing agents of the anionic, cationic, and nonionic types that are commonly employed in compositions for application to plants can be used. Surfactants having sufficient wetting activity and therefore being suitable for the compositions of this invention include alkyl sulfates and sulfonates, alkyl aryl sulfonates, sulfosuccinate esters, polyoxyethylene sulfates, polyoxyethylenesorbitan monolaurate, alkyl aryl polyether sulfates, alkyl aryl polyether alcohols, alkyl quaternary ammonium salts, sulfated fatty acid esters, sulfated fatty acid amides, glycerol mannitan laurate, polyalkylether condensates of fatty acids, lignin sulfonates, and the like. It will be understood, of course, that the sulfate and sulfonate compounds suggested above will preferably be used in the form of their soluble salts, e.g., sodium salts. All of these surfactants are capable of reducing the surface tension of water to less than about 40 dynes per centimeter in concentrations of about 1% or less.

Suitable stickers or adhesives include albumin, calcium caseinate, alkylphenoxy polyoxyethylene ethanol (Hyonic PE–50), coconut oil fatty acid modified phthalic polyglycerol copolymer (Triton B–1956), and the like.

Dusts are prepared by dispersing sparsomycin A in an inert dusting powder such as pyrophyllite, diatomite, clays such as bentonite, Georgia clay, Attapulgus clay, Barden clay, wood or walnut shell flour, and the like. Dusting powder is understood to be a solid material comminuted so that it has an average particle size of less than 50 microns, advantageously, less than 15 microns. The amount of sparsomycin A active ingredient suitably present in a dusting powder formulation can vary advantageously from about 1% to about 90%, by weight, preferably about 1% to 25%, by weight. Illustratively, a dusting powder is obtained by mixing approximately equal parts of the active ingredient and pyrophyllite, comminuting either before or after the admixture as desired.

A wettable powder suitable for dispersing in an aqueous vehicle is obtained by adding a surfactant to a dusting powder. Suitable surfactants include sodium lauryl sulfate, sodium and calcium lignosulfonates, 1-tetradecyl-4-methylpyridinium chloride, Triton X–100 (isooctylphenoxy polyethoxy ethanol), and Pluronic F–68 (ethylene oxide-propylene glycol condensate, nonionic surfactant). If desired, the surfactant can be incorporated in the dry mixture either by dry milling or by adding it in solution in a volatile solvent such as ethanol or acetone, mixing to form a paste, drying, and milling.

For convenience in handling, sparsomycin A can be prepared with or without adjuvants in the form of concentrated solutions in a solvent, for example, acetone, ethyl acetate, dimethylformamide, dimethylacetamide, dimethyl sulfoxide, acetonitrile, cyclohexanone, and similar polar solvents. Such concentrates can be dispersed in a suitable volume of an aqueous medium in the presence of a surfactant such as those disclosed above to give a mixture of any desired concentration. The surfactant can be included in a concentrated solution of the active ingredient in a solvent to give an emulsifiable concentrate, or it can be added separately when the aqueous dispersion is being prepared.

For the most part, low concentrations of sparsomycin A are effective, and the concentration in formulations for direct application can range from about 50 to about 10,000 p.p.m. For example, excellent sterilizing action on Colorado potato beetle, *Leptinotarsa decemlineata* Say, has been obtained using concentrations of active ingredient ranging from about 500 to 1000 p.p.m. For example, an emulsifiable concentrate comprising 5% (by weight) of the compound can be admixed with an aqueous medium in the proportions of three tablespoonfuls (about 44 cc.) of concentrate with one gallon of medium to give a mixture containing about 540 to about 675 parts of active ingredient per million parts of water. Similarly, three pints of a 5% concentrate mixed with 25 gals. of water provides about 720 p.p.m. of active ingredient. In the same manner, more concentrated solutions of active ingredient in a solvent can be incorporated with an appropriate quantity of an aqueous medium or petroleum base carrier, e.g. summer oil, kerosene, and like vehicles, to give a dispersible mixture of desired concentration.

A suitable wettable powder formulation is obtained by blending and milling 327 lbs. of Georgia clay, 4.5 lbs. of Triton X–100 as a wetting agent, 9 lbs. of a polymerized sodium salt of a substituted benzoid long-chain sulfonic acid (Daxad 27) as a dispersing agent, and 113 lbs. of sparsomycin A. The resulting formulation has the following percentage composition (parts herein are by weight unless otherwise specified):

| | Percent |
|---|---|
| Sparsomycin A | 25 |
| Triton X–100 | 1 |
| Daxad 27 | 2 |
| Georgia clay | 72 |

This formulation, when dispersed in water at one and one-half pounds per 100 gals., gives a spray formulation containing about 0.045% (450 p.p.m.) active ingredient.

A suitable emulsifiable concentrate is obtained by admixing the folowing materials:

| | Parts |
|---|---|
| Sparsomycin A | 15 |
| Xylene | 81.5 |
| Dodecylbenzene sodium monosulfonate | 1.75 |
| Condensation product of one mole of octylphenol and about 12 moles of ethylene oxide | 1.75 |

The mixture of dodecylbenzene sodium monosulfonate and condensation product is added to the xylene, and the sparsomycin A is then added. This formulation, when dispersed in water at the rate of one pint per 100 gals., gives a spray formulation containing about 0.02% (200 p.p.m.) active ingredient.

Sparsomycin A can also be formulated in relatively dilute proportions in a dispersible insecticide carrier for household applications. Thus, the compound can be formulated in dusts having from about 0.1% to 5.0% active ingredient with a dusting powder as hereinbefore described, and in solutions containing from about 0.01% to about 5.0% active ingredient with deodorized kerosene for aerosol applications.

It will of course be appreciated that the conditions encountered when applying the method and compositions of this invention to actual practice can vary widely. Included among the variables that may be encountered are the degree of infestation by insects, the particular insect to be controlled, the particular plant being treated, the degree of development of the plant, the prevailing weather conditions, such as temperature, relative humidity, rainfall, dews, and so forth.

A preferred method for effecting the reproductive sterility in accordance with the invention employs a novel formulation comprising a solid or liquid carrier diluent for the sparsomycin A comprising an insect nutriment or food which stimulates insects to ingest the formulation and coincidently the active ingredient. If desired, the insect nutriment or food may suitably constitute the whole or substantial part of the carrier diluent. Granulated corn meal, bran, pomace, granulated sugar, and the like are suitable solid carrier diluents. Corn syrup, honey, molasses, and the like are suitable liquid carriers. Illustrative carrier diluents include one prepared by mixing 4 parts granulated sugar and 1 part orange juice crystals, and another prepared by mixing 6 parts powdered milk, 6 parts sugar, and 1 part powdered egg.

In general, suitable insect nutriments or foods for carrier diluents include carbohydrates, for example, sugars such as lactose, sucrose, fructose, glucose, and the like, and polymerized sugars such as starches, dextrins, pectins, and the like, and plant and animal proteins or protein degradation products such as egg albumen, meats, soybean oil meal, cottage cheese, proteoses, peptones, peptides, and the like.

The formulations of this invention containing insect nutriments or food for ingestion by insects may also be or contain an insect attractant for luring insects to the formulation containing the active ingredient. Suitable attractants include sec-butyl 6-methyl-3-cyclohexene-1-carboxylate (for Mediterranean fruit fly), sec-butyl 4 (or 5)-chloro-6-methylcyclohexanecarboxylate, methyleugenol, 4 - (p - acetoxyphenyl) - 2 - butanone, anisylacetone, and the like.

The sparsomycin A active ingredient of this invention is prepared according to the following procedure:

Preparation I—

A. Fermentation:

A soil slant of *Streptomyces sparsogenes* var. *sparsogenes*, NRRL 2940, was used to inoculate a series of 500-ml. Erlenmeyer flasks each containing 100 ml. of seed medium consisting of the following ingredients:

| | |
|---|---|
| Glucose monohydrate, grams | 25 |
| Pharmamedia,[1] grams | 25 |
| Tap water q.s., liter | 1 |

[1] Pharmamedia is an industrial grade of cottonseed flour produced by Traders Oil Mill Co., Fort Worth, Tex.

The seed medium presterilization pH was 7.2. The seed was grown for two days at 28° C. on a Gump rotary shaker operating at 250 r.p.m.

One shake flask of the seed described above (100 ml.) was used to inoculate a 20 liter seed tank containing 15 liters of the above sterile seed medium (S–1) plus 1 ml./l. of lard oil. The seed tank was grown for 24 hours at a temperature of 28° C., aeration rate of 10 standard liters/min., and agitated at a rate of 400 r.p.m.

The seed tank, described above, was then used to inoculate a 380-liter fermentor containing 250 liters of the following sterile medium:

| | |
|---|---|
| Glucose monohydrate, g./liter | 10 |
| Dextrin, g./liter | 15 |
| Pharmamedia, g./liter | 20 |
| Wilson's Peptone Liquor No. 159,[1] g./liter | 5 |
| Lard oil, ml./liter | 2 |
| Tap water | Balance |

[1] Wilson's Peptone Liquor No. 159 is a preparation of hydrolyzed proteins from animal origin.

The fermentation then proceeded for 113 hours during which time the temperature was controlled at 28° C., filtered air supplied at a rate of 100 standard liters/minute, and agitation at 28 r.p.m. During the course of the fermentation, 1850 ml./l. of lard oil was added as an antifoam.

B. Recovery:

The whole beer from the above fermentation was adjusted from the harvested pH of 7.1 to pH 2.4 with 350 ml. of sulfuric acid (concentrated) and filtered using 3.6% diatomaceous earth as filter aid. The filter cake was washed with 0.2 volume of deionized water, the clear beer plus wash (vol. 280 liters) was adjusted to pH 7.35 with 300 ml. of 50% aqueous sodium hydroxide and allowed to stand overnight at 10° C. The clear beer was then adjusted to pH 8 with 50 ml. of 50% aqueous sodium hydroxide and stirred one hour with 1% decolorizing carbon and 3% diatomite. The mixture was filtered and the carbon cake washed with 0.2 volume of 20% aqueous acetone. The washed carbon cake was eluted twice with 0.4 volume of 50% aqueous acetone, acidified to pH 2.5 with concentrated sulfuric acid, and the eluates pooled. The pooled acetone eluate (72 liters) was adjusted to pH 6.4 with 30 ml. of 50% aqueous sodium hydroxide and concentrated to an aqueous solution (40 liters). The concentrate was adjusted to pH 5.9 and freeze dried to give 447 g. of lyophilized material.

An additional 1126 g. was obtained by twice repeating the above fermentation and recovery. The combined lyophilized material (1573 g.) was slurried in 10 liters of methanol at 40° C. for one hour. Insoluble material was filtered off and washed three times with 500 ml. of warm methanol (40° C.). The methanol extracts and washes were combined (11.5 liters) and concentrated in vacuo to a dry preparation weighing 321 g. (HRV-25.3) and assaying 1.25 *Proteus vulgaris* biounits/mg.

C. Purification—

(1) Partition column:

Three hundred grams of the above preparation (HRV-25.3) was placed in a partition column which was prepared and developed in the following manner. A solvent system was made using equal volumes (350 liters) of McIlvaine's pH 6.0 buffer and methy ethyl ketone. A slurry containing 9.6 kg. of diatomite in 60 liters of upper phase and 4.8 liters of lower phase of the above described solvent system was poured into a 12″ column and packed with 4 p.s.i.g. of nitrogen. The column feed was dissolved in 3 liters of lower phase, slurried with 1920 g. of diatomite and enough upper phase added to make it mobile. The feed was carefully added to the top of the column bed which was covered with a layer of sea sand. The column was eluted with upper phase solvent at a rate of 2 l./minute. Four-liter fractions were collected except at the beginning and end of the column when 20-liter fractions were collected. The fractions were concentrated and bioactivities observed on *P. vulgaris* trays.

(2) Purification of sparsomycin A:

The sparsomycin A component was purified and crystallized in the following manner. Fractions 11–20, inclusive, from the previously described partition column—part C(1)—contained the sparsomycin A component. These fractions were pooled and concentrated under reduced pressure and 7.2 grams of crystalline material was isolated. These crystals were dissolved in 400 ml. of water and 50 ml. of 0.1 N HCl. The solution was heated gently to facilitate dissolving and then filtered. The clear solution was adjusted to pH 9.0 with 50% aqueous sodium hydroxide and chilled in the refrigerator for 5 hours. The crystals were collected by filtration, washed with water, and dried to give 5.65 grams of preparation ADA-102.1. Two grams of this preparation were then dissolved in 75 ml. of water and 20 ml. of 0.1 N HCl. This clear solution was adjusted to pH 9.0 with 50% aqueous sodium hydroxide. Crystallization started immediately. The solution was left at 25° C. for 7 hours and then the crystals were collected, washed with 25 ml. of water, and dried to yield 1.52 grams of preparation ADA-105.1 having a melting point of 247.8–250° C., an optical rotation $[\alpha]_D^{25}$ −62° (c.=0.718 in 0.1 N HCl), an equivalent weight of 269, pKa′ of 5.07 in water, an ultra-violet absorption spectrum in

| | |
|---|---|
| Water | 270 mμ, a=44.14 |
| 0.01 N $H_2SO_4$ | 227 mμ, a=85.28 |
| | 271 mμ, a=40.82 |
| 0.01 N KOH | 270 mμ, a=43.50 | a characteristic I.R. absorption at the following frequencies expressed in reciprocal centimeters

| | | | |
|---|---|---|---|
| 3350 (S) | | 1198 (W) | |
| 3250 (S) | | 1160 (W) | |
| 3145 (S) | | 1134 (M) | |
| 3095 (S) | (sh) | 1120 (M) | |
| 2880 (S) | (oil) | 1093 (M) | |
| 2810 (S) | (oil) | 1080 (W) | |
| 1895 (W) | | 1055 (M) | |
| 1640 (S) | | 1042 (S) | |
| 1592 (S) | | 1017 (S) | |
| 1553 (M) | | 992 (S) | |
| 1502 (M) | | 953 (W) | |
| 1475 (M) | | 912 (W) | |
| 1458 (S) | (oil) | 903 (M) | |
| 1445 (M) | (sh) | 867 (M) | |
| 1426 (M) | | 852 (W) | |
| 1370 (M) | (oil) | 842 (W) | |
| 1351 (M) | | 799 (W) | |
| 1306 (M) | | 715 (W) | |
| 1276 (W) | | 704 (S) | |
| 1255 (S) | | 675 (M) | |
| 1241 (M) | | 658 (M) | | and the following elemental analysis:

Calculated for $C_{11}H_{14}N_4O_4$: C, 49.62; H, 5.30; N, 21.04. Found: C, 49.81; H, 5.20; N, 20.92.

Sparsomycin A was also isolated and purified from fermentation broth in another manner. The fermentation was carried on as described above under A. The whole beer (AJW-63) was adjusted to pH 2.5 with 365 ml. of concentrated sulfuric acid and filtered using 6% diatomaceous earth as filter aid. The filter cake was washed with 0.1 volume of deionized water and the wash added to the clear beer. The clear beer was then adjusted to pH 8.0 with 400 ml. of 50% aqueous sodium hydroxide and stirred one hour with 1% decolorizing carbon and 3% diatomite. The mixture was filtered and the carbon cake washed with 0.1 volume of deionized water followed by 0.2 volume of 20% aqueous acetone. The washed carbon was eluted twice with 0.4 volume of 50% aqueous acetone which had been acidified to pH 2.5 with concentrated sulfuric acid, and the eluates pooled. The pooled acetone eluates were then adjusted to pH 4.8 with 53 ml. of 50% aqueous sodium hydroxide, concentrated to an aqueous solution and freeze-dried to yield 284 grams of preparation WMH-32.6 assaying 9KB μ/mg. in tissue culture. One hundred grams of this preparation was then dissolved in 600 ml. of methanol and 4 volumes of ether added to precipitate the inactive material. From the methanol-ether supernatant two crops of crystalline material were isolated by allowing the solvent to evaporate slowly. These preparations were pooled and redissolved in 35 ml. of water and 5 ml. of 0.1 N hydrochloric acid. The solution was then filtered and adjusted to pH 9.4 with 50% aqueous sodium hydroxide. The sparsomycin A which separated in crystalline form was collected, washed with water, and dried to give 480 mg. of preparation ADA-104.1 having a melting point of 247.8–250.8° C., an optical rotation $[\alpha]_D^{25}$ −61° (c.=0.908 in 0.1 N HCl), an equivalent weight of 270, pKa′ of 5.05 in water, an ultra-violet absorption spectrum in

| | |
|---|---|
| Water | 269.5 mμ, a=44.27 |
| 0.01 N $H_2SO_4$ | 227 mμ, a=86.06 |
| | 271 mμ, a=41.35 |
| 0.01 N KOH | 270 mμ, a=43.61 | a characteristic I.R. absorption at the following frequencies expressed in reciprocal centimeters

| | |
|---|---|
| 3400(S) | 1285(M) |
| 3310(S) | 1280(M) |
| 3240(S) | 1260(S) |
| 3220(S) | 1245(S) |
| 3140(S) | 1200(M) |
| 2950(S) (oil) | 1164(M) |
| 2920(S) (oil) | 1137(S) |
| 2850(S) (oil) | 1125(M) |
| 2620(M) | 1092(S) |
| 1910(W) | 1084(M) |
| 1650(S) | 1057(M) |
| 1645(S) | 1045(S) |
| 1600(S) | 1020(S) |
| 1562(S) | 995(S) |
| 1510(M) | 955(M) |
| 1480(S) | 912(M) |
| 1462(S) (oil) | 905(M) |
| 1425(S) | 870(S) |
| 1370(M) (oil) | 852(W) |
| 1355(S) | 843(W) |
| 1342(M) | 800(M) |
| 1310(S) | 715(S) |
| | 702(S) | and the following elemental analysis:

Calculated for $C_{11}H_{14}N_4O_4$: C, 49.62; H, 5.30; N, 21.04. Found: C, 49.62; H, 5.04; N, 20.81.

The following examples are illustrative of the process and compositions of the present invention, but they are not to be construed as limiting.

The antibiotic sparsomycin A was originally called "sparsogenin A"; so the "sparsomycin A" of this application is identical with "sparsogenin A."

The characteristics of sparsomycin A as described in this application agree with those reported in the literature for tubercidin [see Anzai et al., "A New Antibiotic, Tubercidin," J. Antobiotics, Ser. A., 10, pp. 201–204 (1957) and Mizuno et al., Chem. Pharm. Bull., 11, pp. 1091–1094 (1963)]. Notwithstanding the failure of the literature reports to describe a process for producing tubercidin, the chemical and biological properties of sparsomycin A and tubercidin are so similar that they are believed to be the same chemical compound.

Example 1

Two populations of about 300 to 500 house flies, *Musca domestica* Linnaeus, were treated and observed as follows: One population was fed a dry diet consisting of 6 parts powdered milk, 6 parts sugar, and 1 part powdered egg. Water was also provided in a separate dish ad libitum. The other population was fed 1.0 percent sparsomycin A in the same basic diet with water ad libitum. Eggs from the normal untreated population hatched substantially 100 percent, whereas the sparsomycin A treated population did not lay eggs.

Example 2

In a field test, 10 kg. of a diluent carrier consisting of 6 parts powdered milk, 6 parts corn syrup, and 1 part powdered egg and water was thoroughly mixed with 10 g. of sparsomycin A and portions were spread out in shallow pans placed at various sites in a large, relatively isolated dairy feed lot and barn. Within 3 months, the population of house flies and faceflies had declined to the point that very few were seen on the premises.

Example 3

A 4' x 6' plot of 28-day old bean plants was thoroughly sprayed with a wettable powder spray containing 1 percent sparsomycin A. After the leaves had dried, adult strawberry spider mites, *Tetranychus atlanticus*, were released on the leaves in numbers sufficient to infest the plants. The plants were carefully inspected daily for eggs, young mites, and the adults. After 5 to 7 days few young mites were found, several plants having eggs deposited on the leaves removed for observation did not hatch, and the population of adult mites was decreasing. Within 3 weeks the plot was substantially free of the spider mites.

We claim:

1. The process of controlling insects which comprises applying to said insects an effective amount of sparsomycin A.
2. The process of rendering insects reproductively sterile which comprises inducing insects to ingest an effective amount of sparsomycin A.
3. The process of claim 1 wherein dipterous insects are controlled.
4. The process of claim 2 wherein dipterous insects are made reproductively sterile.
5. The process of rendering insects reproductively sterile which comprises inducing insects to ingest an effective amount of a composition comprising 0.005 percent to 1.0 percent sparsomycin A, a nutriment, and a carrier diluent.
6. The process of claim 5 wherein the nutriment is a carbohydrate.
7. The process of claim 3 wherein house flies, *Musca domestica* Linnaeus, are controlled.
8. The process of claim 7 wherein the house flies are made reproductively sterile.
9. Composition for rendering insects reproductively sterile which comprises from about 0.01 to about 1.0 percent sparsomycin A, as the essential active ingredient, and a carrier diluent comprising an insect nutriment.
10. Composition according to claim 9 and an insect attractant.
11. Composition for rendering dipterous insects reproductively sterile which comprises from about 0.01 to about 1.0 percent sparsomycin A as the essential active ingredient, and a carrier diluent consisting of powdered milk, sugar, and powdered egg.

No references cited.

JULIAN S. LEVITT, *Primary Examiner.*

JEROME D. GOLDBERG, *Assistant Examiner.*